US009912167B2

(12) United States Patent
Krammer et al.

(10) Patent No.: US 9,912,167 B2
(45) Date of Patent: Mar. 6, 2018

(54) DEVICE FOR INDUCTIVELY TRANSMITTING POWER

(71) Applicant: Bayerische Motoren Werke Aktiengesellschaft, Munich (DE)

(72) Inventors: Josef Krammer, Holzkirchen (DE); Jens Berger, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 569 days.

(21) Appl. No.: 14/500,346

(22) Filed: Sep. 29, 2014

(65) Prior Publication Data

US 2015/0015086 A1  Jan. 15, 2015

Related U.S. Application Data

(63) Continuation of application No. PCT/EP2013/055812, filed on Mar. 20, 2013.

(30) Foreign Application Priority Data

Mar. 30, 2012 (DE) ........................ 10 2012 205 285

(51) Int. Cl.
*H02J 5/00* (2016.01)
*H02J 50/60* (2016.01)
*B60L 11/18* (2006.01)
*H01F 38/14* (2006.01)
(Continued)

(52) U.S. Cl.
CPC ............ *H02J 5/005* (2013.01); *B60L 3/0069* (2013.01); *B60L 11/182* (2013.01); *G01V 3/10* (2013.01); *H01F 38/14* (2013.01); *B60L 2240/36* (2013.01); *B60L 2270/147* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ..................................................... H02J 5/005
See application file for complete search history.

(56) References Cited

U.S. PATENT DOCUMENTS 2,550,688 A    5/1951  Gossick
2006/0226833 A1  10/2006  Kubotera et al.
(Continued)

FOREIGN PATENT DOCUMENTS

CA    2 766 854 A1    1/2011
CN      1759329 A    4/2006
(Continued)

OTHER PUBLICATIONS

STIC Search Report dated Jan. 11, 2017.*
(Continued)

*Primary Examiner* — Jared Fureman
*Assistant Examiner* — James Evans
(74) *Attorney, Agent, or Firm* — Crowell & Moring LLP

(57) ABSTRACT

A system is provided for inductive power transmission. The system includes a primary unit having a primary coil and a secondary unit having a secondary coil. The primary coil generates a magnetic transmission field in a transmission area between the primary unit and the secondary unit. The system includes a metal detector, and the metal detector is suitable for the detection of a metallic object situated in the transmission area.

14 Claims, 3 Drawing Sheets

(51) Int. Cl.
*B60L 3/00* (2006.01)
*G01V 3/10* (2006.01)

(56) References Cited

U.S. PATENT DOCUMENTS

| | | | |
|---|---|---|---|
| 2008/0211614 A1* | 9/2008 | Mecke | H01F 38/18 336/120 |
| 2012/0146580 A1 | 6/2012 | Kitamura | |
| 2012/0181875 A1* | 7/2012 | Wechlin | B60L 3/00 307/104 |
| 2012/0313579 A1 | 12/2012 | Matsumoto et al. | |
| 2013/0069441 A1* | 3/2013 | Verghese | G01R 33/10 307/104 |
| 2013/0099592 A1 | 4/2013 | Abe | |

FOREIGN PATENT DOCUMENTS

| | | |
|---|---|---|
| DE | 10 2009 033 237 A1 | 1/2011 |
| EP | 0 923 182 A2 | 6/1999 |
| FR | 2 947 114 A1 | 12/2010 |
| JP | 2002-277441 A | 9/2002 |
| JP | 2008-288889 A | 11/2008 |
| JP | 2011-211760 A | 10/2011 |
| JP | 2012-16125 A | 1/2012 |
| WO | 2011/036863 A1 | 3/2011 |
| WO | 2013/036947 A2 | 3/2013 |

OTHER PUBLICATIONS

German Search Report dated Feb. 18, 2013 with partial English Translation (Thirteen(13) pages).
International Search Report (PCT/ISA/210) dated Sep. 3, 2014 with English Translation (Seven (7) pages).
Chinese Office Action issued in counterpart Chinese Application No. 201380023819.3 dated Dec. 4, 2015 with English-language translation (eighteen (18) pages).

* cited by examiner

DEVICE FOR INDUCTIVELY TRANSMITTING POWER

CROSS REFERENCE TO RELATED APPLICATIONS

This application is a continuation of PCT International Application No. PCT/EP2013/055812, filed Mar. 20, 2013, which claims priority under 35 U.S.C. § 119 from German Patent Application No. 10 2012 205 285.2, filed Mar. 30, 2012, the entire disclosures of which are herein expressly incorporated by reference.

BACKGROUND AND SUMMARY OF THE INVENTION

The invention relates to a system for inductive power transmission, which system comprises a primary unit having a primary coil and a secondary unit having a secondary coil. The primary coil generates a magnetic transmission field in a transmission area between the primary unit and the secondary unit.

Inductive power transmission systems are known from the state of the art. An induction charging system for a vehicle for charging an electric energy accumulator is described, for example, in French Patent Document FR 2 947 114 A1. The induction system consists of a ground unit having a primary coil and of a vehicle unit having a secondary coil. The distance between the two coils during the charging amounts to approximately 0.1 m.

An induction charging system for an electric vehicle is designed for the transmission of power in the range of several kilowatts.

It is an object of the invention to provide an improved system for the energy transmission.

This and other objects are achieved by a system for inductive power transmission, which system comprises a primary it having a primary coil and a secondary unit having a secondary coil. The primary coil generates a magnetic transmission field in a transmission area between the primary unit and the secondary unit. The system further comprises a metal detector, wherein the metal detector is suitable for detecting a metallic object situated in the transmission area.

According to the invention, the system comprises a metal detector which is suitable for the detection of a metallic object situated in the transmission area.

In the case of the inductive power transmission, for example, for charging an electric vehicle, field intensities therefore prevail in the transmission area that are so high that a metallic object experiences considerable heating as a result of induced eddy currents. It is advantageous to detect metallic objects in the transmission area or in the proximity of the transmission area early, i.e. before such a heating can occur.

According to a preferred embodiment of the invention, the metal detector has at least one pair of coils, which comprises a transmitter coil and a signal coil.

It is advantageous for the metal detector to be operable according to the pulse measuring method and/or the alternating-current measuring method by use of an alternating frequency.

This means that, in the transmission area, a magnetic field generated by the transmitter coil is superimposed on the transmission field. This magnetic field is called a detector field.

According to a particularly preferred embodiment, the signal coil has at least two coil elements, which are wound in opposite directions, are electrically connected in series and are symmetrical with respect to the axis along which the transmission field is oriented in the transmission area.

It can thereby be ensured that the signal coil is insensitive to the almost homogeneous transmission field. If the two symmetrical coil elements are penetrated by a homogeneous magnetic field, there will be no resulting total voltage because the voltages induced in the two coil elements are antipolar series. As a result, the transmission field is separated off in the reference system of the signal coil, and the signal coil is particularly sensitive to changes of the detector field because of metallic objects entering into or situated in the transmission area.

According to a further variant, the primary coil generates the transmission field with a transmission frequency that exceeds the alternating frequency multiple times or falls below it multiple times.

This results in an additional possibility of separating a residual induction of the signal coil by the transmission field from the induction by the detector field or the detector field disturbed by a metallic object during the signal detection.

An arrangement is particularly advantageous which has the system according to the invention for the inductive power transmission and has a vehicle to which electric power can be inductively transmitted, and which comprises the secondary unit that is situated in the area of the underbody of the vehicle, and where the primary unit is situated outside the vehicle and the metal detector is a part of by the primary unit or the secondary unit.

This means that the vehicle can be inductively charged, and the inductive charging system has a metal detector. The metal detector makes it possible to monitor the power transmission area between the primary unit and the secondary unit with respect to the presence or the penetration of metallic objects and, if required, influence or interrupt the charging operation. This results in a high degree of system safety because metallic objects could be heated by eddy currents to the point of self-ignition at the field intensities prevailing for charging a vehicle.

The invention is based on the considerations described in the following.

With respect to inductive systems for power transmission, for example, for charging a vehicle having an electrified drive train, there are currently no systems which detect metallic objects in the transmission path in a cost-effective and reliable manner. Optical systems, such as an infrared camera, can easily become dirty and detect a heating of the metallic object only if the metallic object is not covered by a neutral body. Appropriately dimensioned ultra-sound systems detect all objects that are sufficiently large compared to a vehicle. Small or flat objects (for example, coins) are not detected. Under certain circumstances, they may even reduce the availability because also non-metallic objects may possibly be detected as being metallic. Magnetic and metallic objects present in the system as well as the very intense transmission field interfere with a classic metal detector, known, for example, from geology, during the charging of, for example, an electric vehicle.

Inductive systems for power transmission have the disadvantage that they heat up metallic objects situated in the transmission path. This leads to risks, such as the danger of injury when touching the objects or because of the ignition of flammable substances in their proximity.

It is therefore suggested to modify a classic metal detector system with respect to some features in order to be able to utilize the common proven system also in the inductive transmission path and during the inductive power transmission.

Essential design elements for the functional separation of the detector function from the inductive energy transmission are the design of the detector coils as well as the utilization of a frequency range clearly remote in the frequency domain (detector to transmission) with a corresponding signal filtering.

Other objects, advantages and novel features of the present invention will become apparent from the Mowing detailed description of one or more preferred embodiments when considered in conjunction with the accompanying drawings.

DETAILED DESCRIPTION OF THE DRAWINGS

Figure 1:
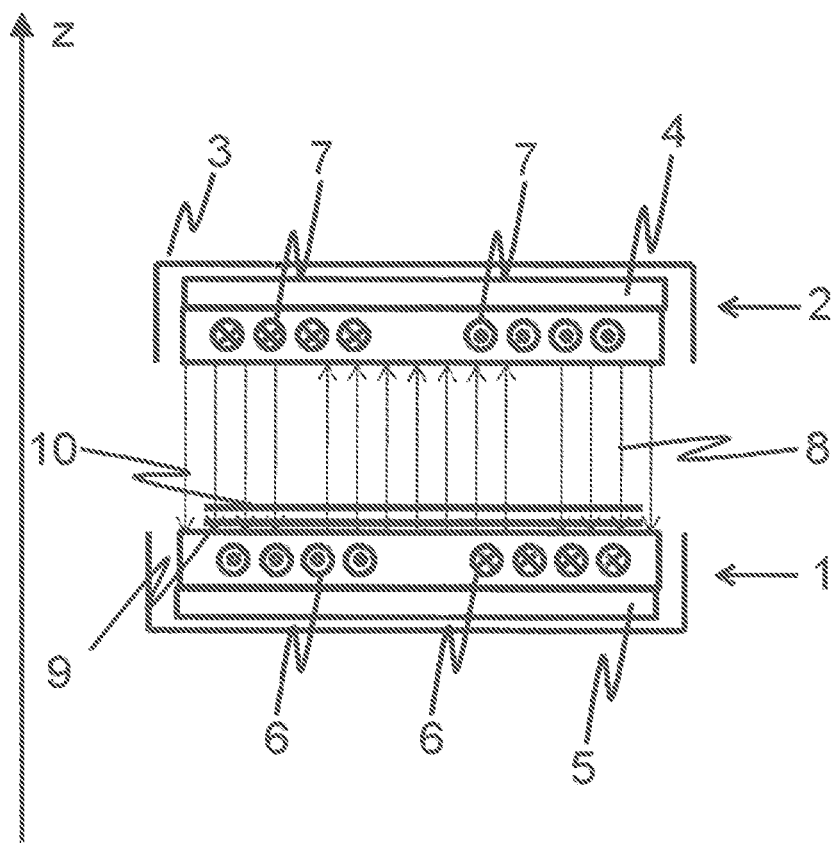
FIG. 1 is a schematic view of a system for the inductive power transmission having a detector unit according to an embodiment of the invention.

FIG. 1 illustrates a system for inductively transmitting power. The system is suitable, for example, for transmitting electric power to a vehicle in order to charge, for example, an energy accumulator (store) of the vehicle. The system includes a primary unit 1 having a primary coil 6 and a secondary unit 2 having a secondary coil 7.

The primary unit 1 generates a magnetic alternating field with a transmission frequency, which alternating field induces a voltage at the secondary coil 7 according to the induction principle. This voltage can be used as charging voltage in the vehicle. The magnetic alternating field is called a transmission field.

When the system is used for the inductive charging of a vehicle energy accumulator, the secondary unit 2 may be integrated in the area of the vehicle underbody. The primary unit 1 is situated outside the vehicle and may be integrated, for example, in a vehicle parking site and/or a vehicle charging site.

The vehicle can then be charged when it is located in the area of the vehicle charging site such that a sufficient spatial overlapping of the secondary coil 7 with the primary coil 6 is established with respect to the x-direction and the y-direction. Furthermore, the x-direction and the y-direction relate to the vehicle coordinate system known to the person skilled in the art. In this embodiment, the transmission field is oriented in the transmission area along the z-axis and is rotationally symmetrical with respect to the z-axis. It is an alternating field with a frequency, which is called a transmission frequency.

During charging, the primary coil 6 generates the transmission field 8 which may be rotationally symmetrical with respect to the z-axis. The field area of the transmission field, which, during the charging, is situated between the primary unit and the secondary unit, is called a transmission area.

By using two ferrite blocks 4,5 in each case on the side of the primary or secondary coil facing away from the transmission area in the z-direction, an additional concentration of the transmission field can be achieved in the transmission area. The primary coil 6 and the ferrite block 4 are integrated in a first housing 1; the secondary coil 7 and the ferrite block 5 are integrated in a second housing 2.

In the transmission area, a metal detector is situated, which comprises a transmitter unit 9 and a signal unit 10. Both units 9, 10 are arranged essentially perpendicular with respect to the z-axis in the transmission area.

Figure 2:
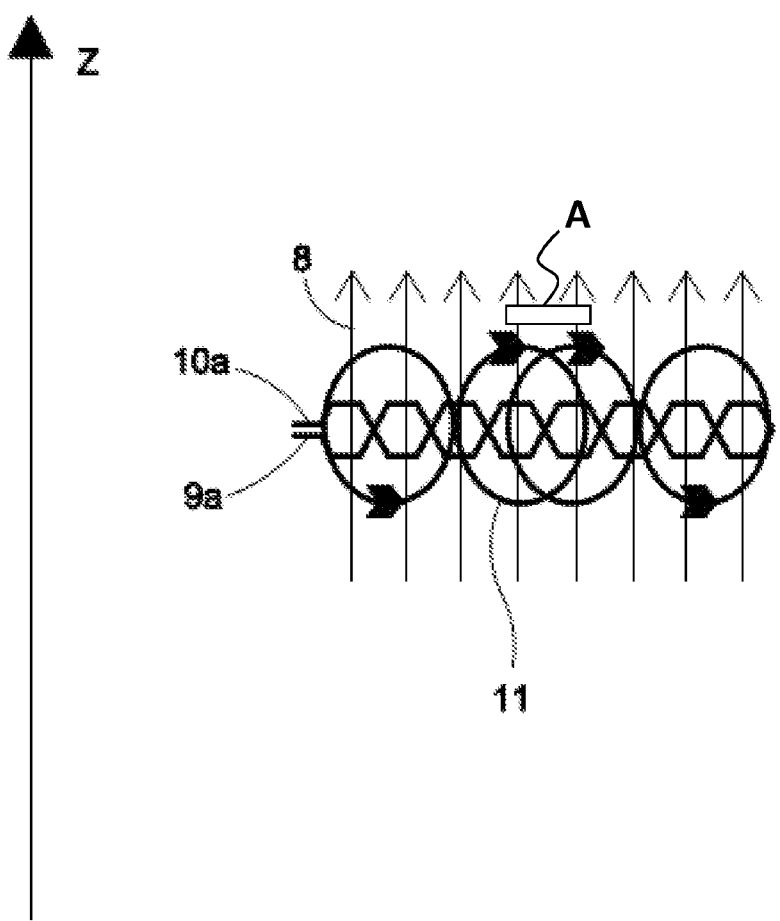
FIG. 2 is as schematic of a detail of a metal detector in the system.

The transmitter unit 9 consists of a plurality of transmitter coils, as an example 9a, which is opposed by the same number of signal coils, as an example 10a. This is illustrated in FIG. 2. Each transmitter coil generates a detector field 11, which is superimposed on the transmission field 8. If a metallic object A is situated in the transmission area or enters into the transmission area, the defined detector field experiences a change because of the alternating effect of the metallic object with the detector field. Instead of the actual detector field, the signal coil acquires the resulting superimposition field. The presence of a metallic object can thereby be detected in the detector area.

In the reference system of the signal coil, the superimposition of the detector field with the transmission field also leads to the detection of a field deviating from the detector field, which would indicate the presence of a metallic object. In order to prevent this, the signal coils are designed in a special manner; see FIG. 3. As seen from the z-axis, each signal coil has two partial coils 10b, 10c which are wound in opposite directions with respect to one another and act electrically in series with one another. The two coil parts are symmetrical with respect to the z-axis, at a same point-in-time, as a result of the rotational symmetry of the transmission field, they are each penetrated by approximately the same magnetic flux density. A further development, for example, in the shape of a figure eight, will ensure such a symmetry.

Figure 3:
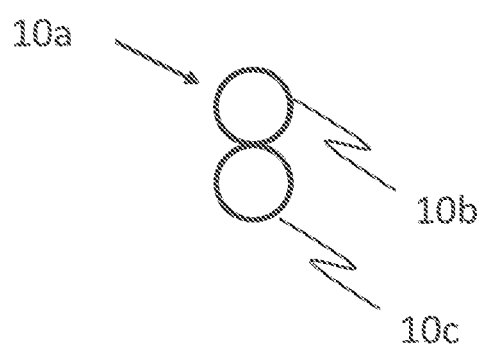
FIG. 3 is a schematic view of a signal coil from the z-direction.

The design of the signal coil according to FIG. 3 ensures that an almost complete compensation of the voltage induced in each partial coil is achieved and, as a result, the entire voltage of the signal coil induced by the transmission field is almost minimal. In this manner, the influence of the undisturbed transmission field, as seen from the signal coil, during the detection is almost completely separated. However, the signal coil is sensitive to a local change of the transmission field of the detector field by a metallic object.

The metal detector has a plurality of transmitter and signal coils in order to detect the entire transmission area perpendicular to the z-axis.

The metal detector has an operating and analyzing unit.

By means of the operating unit, the metal detector can be operated according to a pulse measuring method and/or according to an alternating-current measuring method with an alternating frequency.

As a function of time, the analyzing unit detects the voltage induced at the signal coil and compares this measured voltage with the induction to be expected at that point in time with respect to the generated detector field. Because of the superimposition with the detector field, a metallic object will cause a clear deviation of the measured voltage from the voltage to be compared.

According to a further embodiment, several transmitter coils and signal coils can be combined in the form of a series connection for measuring the voltage at the signal coil. As a result, it becomes possible to simultaneously measure all signal coils of the series connection by way of one analyzing unit. This permits the use of a simplified analyzing unit for the entire detector unit which means, however, that there is no precise localization of the "responding" signal coil in the series branch.

Ideally, the alternating frequency deviates dearly from the transmission frequency. The transmission frequency may, for example, amount to 150 kHz and the alternating frequency may amount to 10 kHz. The analyzing unit has a filter; here, a low-pass filter. By means of the filter, a residual induction originating from the transmission field at a signal coil can be suppressed in the detector signal of the analyzing unit.

If the geometric design of the signal coils according to FIG. 3 and of the filters of the analyzing unit does not sufficiently remove interferences from the metal detector with respect to the transmission field, the metal detector can additionally be operated cyclically. This means that the power transmission by the transmission field is alternately reduced or switched off for a brief time period and the metal detector is activated.

Within the transmission area, the metal detector can be arbitrarily positioned with respect to the z-axis. The metal detector is preferably integrated in the primary unit. An alternatively preferred embodiment provides for the metal detector to be a part of the secondary unit. Also, one metal detector, respectively, may be provided to be a part of the primary unit and one of the secondary unit.

It is also advantageous for the intensity of the detector field to be proportionately adapted to the distance of the primary unit from the secondary unit along the z-axis in order to detect the entire transmission area by way of the metal detector. The distance between the primary unit and the secondary unit is essentially determined by the road clearance of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for inductive power transmission, the system comprising:
   a primary unit having a primary coil;
   a secondary unit having a secondary coil;
   a metal detector,
   wherein the primary coil generates a magnetic transmission field in a transmission area between the primary unit and the secondary unit,
   wherein the metal detector is configured to detect metallic objects in the transmission area,
   wherein the metal detector comprises:
      a transmitter coil; and
      a signal coil,
      wherein the transmitter coil generates a detector field which is superimposed on the magnetic transmission field and wherein the signal coil acquires a resulting superimposition field and not the detector field if a metallic object is disposed in the transmission area.

2. The system according to claim 1, wherein:
   the signal coil has at least two coil elements,
   the two coil elements are wound in opposite directions,
   the two coil elements are electrically connected in series, and
   the two coil elements are symmetrical with respect to an axis along which the magnetic transmission field is oriented in the transmission area.

3. The system according to claim 2, wherein the metal detector is configured to operate according to a pulse measuring method and/or an alternating-current measuring method with an alternating frequency.

4. The system according to claim 1, wherein the metal detector is configured to operate according to a pulse measuring method and/or to an alternating-current measuring method with an alternating frequency.

5. The system according to claim 3, wherein:
   the primary coil of the primary unit generates the magnetic transmission field with a defined transmission frequency, and
   the defined transmission frequency is multiple times greater than or multiple times less than the alternating frequency of the metal detector.

6. The system according to claim 4, wherein:
   the primary coil of the primary unit generates the magnetic transmission field with a defined transmission frequency, and
   the defined transmission frequency is multiple times greater than or multiple times less than the alternating frequency of the metal detector.

7. The system according to claim 1:
   wherein the primary unit comprises a first ferrite block positioned on a side of the primary coil facing away from the transmission area, and
   wherein the secondary unit comprises a second ferrite block positioned on a side of the secondary coil facing away from the transmission area.

8. The system according to claim 2, wherein the metal detector is operated cyclically such that power transmission by the magnetic transmission field is alternately reduced or switched off for a period of time and the metal detector is activated.

9. An arrangement for power transmission, the arrangement comprising:
   a vehicle;
   a power transmission system, the power system transmission comprising:
      a primary unit having a primary coil;
      a secondary unit having a secondary coil;
      a metal detector, wherein
   the primary coil generates a magnetic transmission field in a transmission area between the primary unit and the secondary unit,
   the metal detector is configured to detect metallic objects in the transmission area,
   the secondary unit is a part of the vehicle and is arranged in an area of an underbody of the vehicle,
   the primary unit is arranged externally with respect to the vehicle,
   electric power is inductively transmittable to the vehicle,
   the metal detector is a part of either the primary unit or the secondary unit,
   wherein the metal detector comprises:
      a transmitter coil; and
      a signal coil,
      wherein the transmitter coil generates a detector field which is superimposed on the magnetic transmission field and wherein the signal coil acquires a resulting superimposition field and not the detector field if a metallic object is disposed in the transmission area.

10. The arrangement according to claim 9, wherein:
    the signal coil has at least two coil elements,
    the two coil elements are wound in opposite directions,
    the two coil elements are electrically connected in series, and the two coil elements are symmetrical with respect to an axis along which the magnetic transmission field is oriented in the transmission area.

11. The arrangement according to claim 10, wherein the metal detector is configured to operate according to a pulse measuring method and/or an alternating current measuring method with an alternating frequency.

12. The arrangement according to claim 11, wherein:
the primary coil of the primary unit generates the magnetic transmission field with a defined transmission frequency, and
the defined transmission frequency is multiple times greater than or multiple times less than the alternating frequency of the metal detector.

13. The arrangement according to claim 9:
wherein the primary unit comprises a first ferrite block positioned on a side of the primary coil facing away from the transmission area, and
wherein the secondary unit comprises a second ferrite block positioned on a side of the secondary coil facing away from the transmission area.

14. The arrangement according to claim 10, wherein the metal detector is operated cyclically such that power transmission by the magnetic transmission field is alternately reduced or switched off for a period of time and the metal detector is activated.

* * * * *